(12) United States Patent
Murray (10) Patent No.: US 10,516,625 B2
(45) Date of Patent: Dec. 24, 2019

(54) NETWORK ENTITIES ON RING NETWORKS

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 332 days.

(21) Appl. No.: 15/333,167

(22) Filed: Oct. 24, 2016

(65) Prior Publication Data

US 2018/0115500 A1    Apr. 26, 2018

(51) Int. Cl.
*H04L 12/933*    (2013.01)

(52) U.S. Cl.
CPC .................................. *H04L 49/102* (2013.01)

(58) Field of Classification Search
CPC ..... H04L 49/102; H04L 12/427; H04L 12/18; H04L 49/30
See application file for complete search history.

(56) References Cited

U.S. PATENT DOCUMENTS

| | | | | |
|---|---|---|---|---|
| 6,751,697 | B1* | 6/2004 | Shima | H04L 12/18 710/100 |
| 6,865,689 | B1* | 3/2005 | Gibson | H04L 43/50 714/4.2 |
| 8,665,702 | B2 | 3/2014 | Wang et al. | |
| 9,338,060 | B2 | 5/2016 | Singh | |
| 9,444,641 | B2 | 9/2016 | Kulambi | |
| 2003/0233598 | A1* | 12/2003 | Wiley | G06F 11/0709 714/25 |
| 2004/0153861 | A1* | 8/2004 | Ohno | H04L 12/43 714/43 |
| 2009/0316571 | A1 | 12/2009 | Rose | |
| 2010/0226260 | A1 | 9/2010 | Zinjuvadia et al. | |
| 2011/0128970 | A1* | 6/2011 | Breton | H04L 12/2852 370/463 |
| 2014/0341224 | A1* | 11/2014 | Armbruster | H04L 12/42 370/395.53 |
| 2016/0204976 | A1 | 7/2016 | Singh et al. | |
| 2018/0270083 | A1* | 9/2018 | Murray | H04L 41/12 |

OTHER PUBLICATIONS

"ITU-T G.8032 Ethernet Ring Protection Switching," 2015, pp. 1-28, Cisco, Available at: <cisco.com/c/en/us/td/docs/ios-xml/ios/cether/configuration/xe-3s/ce-xe-3s-book/ce-g8032.
Murrary, C.; "Ring Protection Network Module"; Appl. No. PCT/US2015/033530; filed Jun. 1, 2015; 36 pages.

* cited by examiner

*Primary Examiner* — Min Jung
(74) *Attorney, Agent, or Firm* — Hewlett Packard Enterprise Patent Department

(57) ABSTRACT

Examples described herein relate to a network entity on a ring network. In an example, a method includes receiving a first packet by a first network entity via a ring network. It is determined from the first packet that the ring network has a plurality of management entities each claiming a respective network entity. Based on the ring network having the plurality of management entities each claiming the respective network entity, the first network entity is transitioned from an unclaimed state to a dummyclaim state, and the first network entity is isolated from a portion of the ring network.

20 Claims, 9 Drawing Sheets

NETWORK ENTITIES ON RING NETWORKS

BACKGROUND

Networks are used to join computing systems at different sites and across the world. Networks may also be used to couple components of a single system. In a datacenter, a computing system may include several internal networks to carry communications between the various components. Even though the components may be physically separated in different enclosures, the networks enable the components to act as one.

Networks, whether internal or external, may take any of a number of different forms and topologies. For example, some networks use a star topology where each entity (a discrete system, a component, etc.), is coupled to a central access point such as a router or switch. As an alternative, some networks use a ring topology, where, as the name implies, each entity is coupled to two other entities to form a single loop or ring. Packets may be forwarded along the ring from entity to entity until the destination is reached, and the ring network may be unidirectional or bidirectional, allowing packets to be forwarded in a single direction or both directions, respectively.

BRIEF DESCRIPTION OF THE DRAWINGS

Certain examples are described in the following detailed description with reference to the drawings, of which.

DETAILED DESCRIPTION OF SPECIFIC EXAMPLES

A computing system may include any number of processing resources, storage resources, network resources, and/or other resources spread across any number of enclosures. The resources may be electrically and physically arranged into discrete entities such as blade entities, rackmount entities, etc., and the various entities may be communicatively coupled by one or more networks. In one such example, an intra-enclosure network couples processing and storage entities to a switch in a network entity. Entities in the same enclosure connected to the same switch communicate over the intra-enclosure network via the switch.

For larger deployments, the computing system may include an internal network that spans enclosures. In one such example, an inter-enclosure network couples switches across enclosures. An entity may communicate with entities in other enclosures by sending a packet to a local switch via an intra-enclosure network. This switch routes the packet to another switch over the inter-enclosure network, and the second switch provides the packet to the destination entity via another intra-enclosure network. The intra-enclosure network(s) and inter-enclosure network(s) may have any suitable topology, and in some examples, an intra-enclosure network has a star topology while an inter-enclosure network has a ring topology.

To control the various entities, the computing system may have one or more management entities in communication with the switches, and to avoid conflicts, one of the management entities may be designated as the master for the computing system. The master management entity may perform tasks such as assigning names to entities and providing a customer interface for managing components of the computing system. In the course of these tasks, the master management entity may claim those network entities that the manager controls. The master management entity may claim all of the network entities in the computing system. However, due to upgrades, device replacement, and other service tasks, the computing system may have a combination of claimed and unclaimed network entities. In fact, in some examples, the computing system may have more than one master management entity. Should the system have more than one management entity claiming network entities, the system may take remedial steps to mitigate conflicts until the situation is resolved.

In some examples, this includes isolating portions of a ring network having different claiming management entities. To do this, a network entity claimed by a first management entity may reject data packets received over the ring network from a network entity claimed by a second management entity. This effectively transforms the ring network into two isolated linear networks, one per master.

In some instances, the network entities claimed by different management entities may be separated from each other by an unclaimed network entity. To prevent the unclaimed network entity from allowing data to flow between the two isolated networks, the unclaimed network entity may detect that there is more than one claiming management entity on the ring. In response, the unclaimed entity may transition from an unclaimed state into a dummyclaim state.

In the dummyclaim state, the network entity sends packets with a dummy flag or an identifier of a claiming management entity that does not exist. This causes other claimed network entities to reject data packets from the dummyclaim entity because the claiming management entities do not match. Furthermore, the dummyclaim entity rejects data packets from claimed network entity as well as other dummyclaim entities. This further separates the ring network into isolated segments, each with no more than one claiming management entity.

Once the network entity detects that the situation has been resolved and the ring network no longer includes more than one claiming management entity, the network entity transitions from the dummyclaim state back to the unclaimed state where it accepts data packets from any claimed or unclaimed entity.

Many examples in the present disclosure prevent conflicts that may arise from having more than one master management entity. In some such examples, the technique prevents loops in a customer network caused by having more than one active uplink port coupled to the customer network. Furthermore, in some such examples, the technique promotes enclosure data integrity by isolating the data associated with each master management entity. In these examples and others, the present disclosure provides substantial, real world improvements to the operation of a computing system, particularly in the manner in which ring networks are managed. The technique herein may improve network stability and data security in multi-claim situations.

These examples and others are described with reference to the following figures. Unless noted otherwise, the figures and their accompanying description are non-limiting, and no element is characteristic of any particular example. In that regard, features from one example may be freely incorporated into other examples without departing from the spirit and scope of the disclosure.

Figure 1:
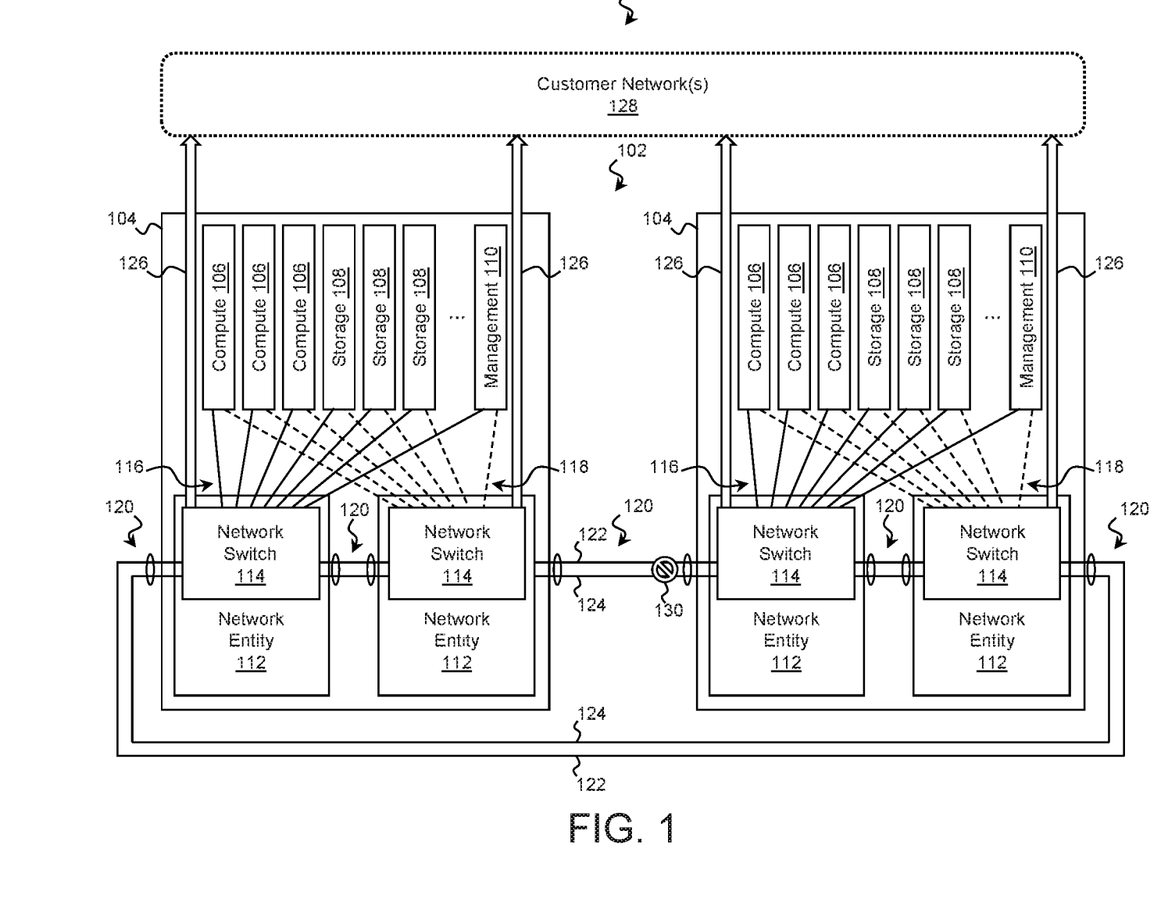
FIG. 1 is a block diagram of a computing environment according to some examples of the present disclosure.

A computing environment for practicing the technique of the present disclosure is described with reference to FIG. 1. In that regard, FIG. 1 is a block diagram of a computing environment 100 according to some examples of the present disclosure. The computing environment 100 includes a computing system 102 that in turn includes any number of computing components arranged in enclosures 104. In various examples, the enclosures 104 include sets of compute entities 106, storage entities 108, management entities 110, network entities 112 and/or other entities.

The compute entities 106, storage entities 108, management entities 110, and network entities 112 may each include a processing resource that, in turn, includes any number and combination of Central Processing Units (CPUs), Graphics Processing Units (GPUs), microcontrollers, Application-Specific Integrated Circuits (ASICs), Field-Programmable Gate Arrays (FPGAs), and/or other processing resources. The entities may also include any amount and configuration of non-volatile memory (e.g., battery-backed RAM, solid state drives, hard disk drives, optical drives, magnetic tape drives, etc.) and/or volatile memory (e.g., cache memory). Additionally or in the alternative, the entities may include device controllers, bus controllers, volatile memory, non-volatile memory, and/or other supporting devices.

The compute entities 106, storage entities 108, and management entities 110 are communicatively coupled to the network entities 112, and specifically to a network switch 114 thereof. In one example, each compute entity 106, storage entity 108, and management entity 110 is coupled to a first network entity 112 in the enclosure 104 by a first intra-enclosure network 116 and, for redundancy, is also coupled to a second network entity 112 in the enclosure 104 by a second intra-enclosure network 118. The intra-enclosure networks 116 and 118 may comply with any suitable protocol, such as Ethernet, Fibre Channel, and/or other suitable network protocols. Each entity may communicate with other entities in the same enclosure 104 using an intra-enclosure network by sending data packets to the switch 114 in one of the coupled network entities 112.

To communicate between enclosures 104, the computing system 102 may include a ring network 120 linking the network switches 114 of the network entities 112 across enclosures 104. In a ring topology, each network switch 114 is communicatively coupled to two other network switches 114 so that a single ring is formed. In a bidirectional example, each network switch 114 has a left path and a right path, providing redundant paths around the ring. If one link becomes disconnected, the network switch 114 may still communicate with the other network switches 114 via the opposite direction around the ring. As with the intra-enclosure networks 116 and 118, the ring network 120 may comply with any suitable network protocol such as Ethernet ring and/or other suitable network protocols.

The network entities 112 may exchange data packets as well as network management packets, and accordingly, the ring network 120 is illustrated as a data ring network 122 and a management ring network 124. In some examples, the data ring network 122 and the management ring network 124 use separate physical channels. In some examples, the data ring network 122 and the management ring network 124 use the same physical channel but are assigned different virtual LAN identifiers to segregate their respective traffic. The data ring network 122 and the management ring network 124 may each be bidirectional or unidirectional.

The ring network 120 allows entities to communicate with entities in other enclosures 104, and in one example, a compute entity 106 in a first enclosure 104 communicates with a storage entity 108 in a second enclosure 104 by providing a data packet to a network entity 112 in the first enclosure 104. The network entity 112 in the first enclosure 104 forwards the data packet along the data ring network 122 to a network entity 112 in the second enclosure 104, and the network entity 112 in the second enclosure 104 provides the data packet to the storage entity 108.

In addition to communicating with the internal networks 114, 116, and 118, the network entities 112 may include uplinks 126 that communicatively couple to one or more customer networks 128. The customer networks 128 may include Local Area Networks (LANs), Metropolitan Area Networks (MANs), Wide Area Networks (WANs), the Internet, etc. The computing system may have multiple uplinks 126 for redundancy, and the network entities 112 may arbitrate amongst themselves to determine which uplink 126 is active. Limiting the computing system 102 to a single active uplink 126 may prevent loops in the customer network 128 where a message broadcast into the computing system 102 via a first uplink 126 is broadcast back into the customer network(s) 128 via a second uplink 126.

The network entities 112 may also implement loop protection for the ring network 120. In brief, if measures are not taken to prevent traffic from being endlessly broadcast around the ring network 120, the network may quickly become overloaded with traffic and become non-functional. To address this, one of the network entities 112 may be elected as a G.8032 Ring Protection Link (RPL) owner. The RPL owner disables a segment (e.g., segment 130) of the ring network 120 by blocking traffic over the segment to prevent a loop.

The network entities 112 may be grouped for active uplink 126 arbitration and/or RPL owner arbitration based on their respective claiming management entity 110. To explain in more detail, one of the management entities 110 of the computing system 102 may be designated the master and another may be designated as a backup. The duties of the master management entity 110 may include naming entities and providing a customer interface for viewing and configuring the compute entities 106, storage entities 108, management entities 110, and/or network entities 112.

In normal function, the computing system 102 may have one master management entity 110 and one backup management entity 110. The master management entity 110 claims each network entity 112 along the ring network 120. A claimed network entity 112 may record an identifier of the claiming master management entity 110 and may include the identifier in packets provided over any of the networks.

The computing system 102 may operate with a combination of claimed and unclaimed network entities 112. However, in some applications, the computing system 102 may have more than one master management entity 110, each claiming different network entities 112. In such multi-claim configurations, the network entities 112 claimed by a first management entity 110 may determine an G.8032 RPL owner and an active uplink 126 independent of those network entities 112 claimed by a second management entity 110. This may cause more than one uplink 126 to be active concurrently. To avoid creating a loop in the customer network 128, the network entities 112 may detect when two or more master management entities 110 are claiming devices and isolate the respective portions of the ring. Examples of this behavior are described with reference to FIGS. 2-4.

Figure 2:
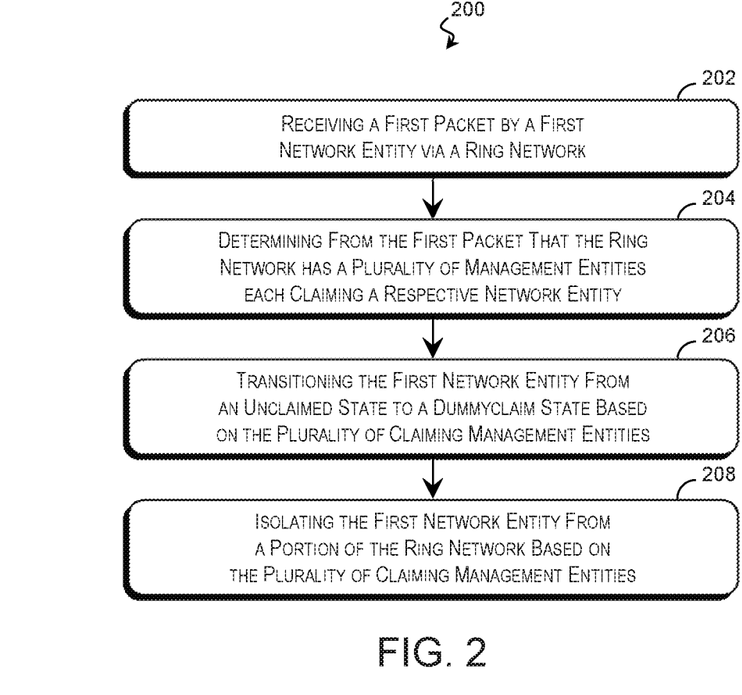
FIG. 2 is a flow diagram of a method of ring network management according to some examples of the present disclosure.
Figure 3:
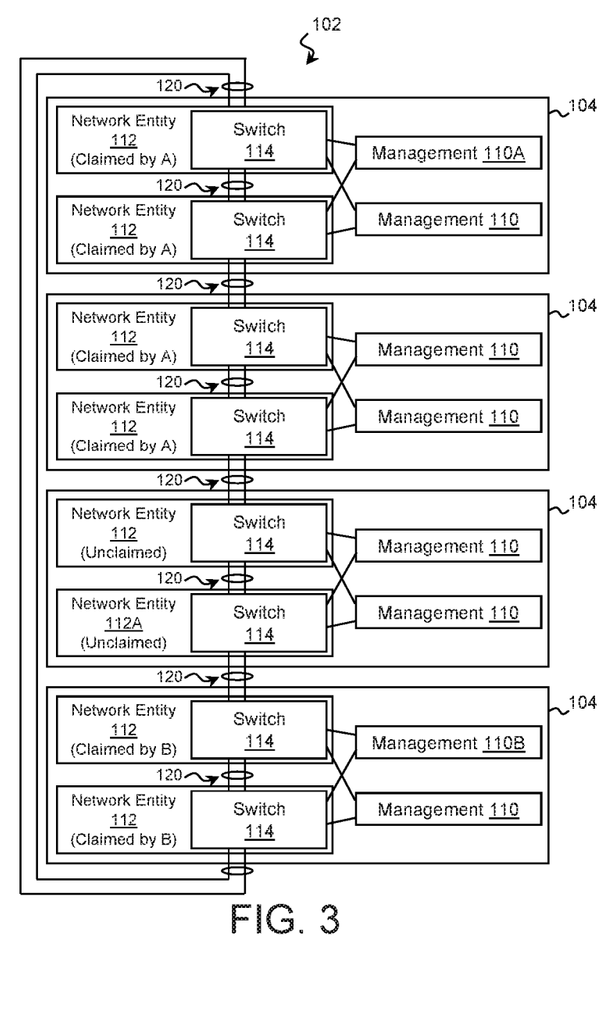
FIGS. 3 and 4 are block diagrams of a computing system at various points in time in the method of ring network management.
Figure 4:
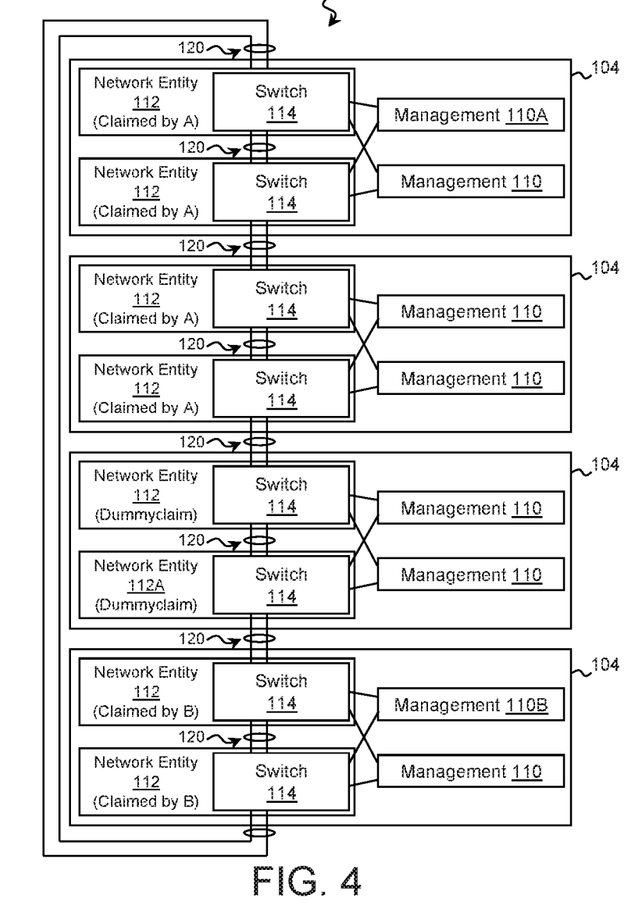

FIG. 2 is a flow diagram of a method 200 of ring network management according to some examples of the present disclosure. The description of method 200 is non-limiting, and steps may be added to and omitted from the method 200 without departing from the disclosure. Furthermore, unless noted otherwise, processes of the method 200 may be performed in any order including being performed concurrently by one or more entities. FIGS. 3 and 4 are block diagrams of a computing system 102 at various points in time in the method 200 according to some examples of the present disclosure. In many aspects, the computing system 102 may be substantially similar to the computing system 102 of FIG. 1. For example, the enclosures 104, management entities 110, network entities 112, network switches 114, and ring network 120 of the computing system 102 may be substantially similar to those described above.

The computing system 102 includes a plurality of enclosures 104, of which, four are illustrated. The enclosures 104 include network entities 112, such as the network entities 112 of FIG. 1, communicatively coupled by a ring network 120. The enclosures 104 also include management entities 110, such as the management entities 110 of FIG. 1, of which management entities 110A and 110B are designated master management entities and each has claimed at least one network entity 112.

Referring first to block 202 of FIG. 2 and to FIG. 3, a first network entity 112A receives a first packet via the ring network 120. The first packet may be a network management packet, a data packet, or other suitable packet and may identify whether the sending network entity 112 is in a claimed or unclaimed state. If the sending network entity 112 is in a claimed state, the first packet may identify the management entity 110 claiming the sender. For example, the first network entity 112A may receive a point-to-point status message such as a Continuity Check Protocol (CCP) message from one of its immediate neighbors on the ring network 120. The CCP message may identify the management entity 110 that has claimed the sender. As a further example, the first network entity 112A may receive an Owner Selection Protocol (OSP) message used to select and/or confirm a G.8032 RPL owner. As with a CCP message, the received OSP message may identify the management entity 110 that has claimed the sending network entity 112. As yet a further example, the first network entity 112A may receive a multicast packet that identifies the management entity 110 that has claimed the multicast sender.

Referring to block 204, the first network entity 112A determines from the first packet that the ring network 120 has more than one management entity 110 claiming the various network entities 112 (e.g., management entity 110A and management entity 110B). In the illustrated example of FIG. 3, four network entities 112 are claimed by management entity 110A, two network entities 112 are claimed by management entity 110B, and two network entities 112 (including the first network entity 112A) are unclaimed.

The first network entity 112A may detect the plurality of claiming management entities 110 by any suitable mechanism, and in an example, the first network entity 112A measures an interval of time using a timer. At the start of each interval, the first network entity 112A records a claiming management entity 110 identified in a packet. If the first network entity 112A receives a subsequent packet within the interval of time that identifies a different claiming management entity 110, the first network entity 112A determines that the ring network 120 has more than one claiming management entity 110.

Referring to block 206 and to FIG. 4, based on the ring network 120 having more than one claiming management entity 110, the first network entity 112A transitions from an unclaimed state to a dummyclaim state. As can be seen in FIG. 4, other network entities 112 in the same enclosure 104 may be performing the processes of blocks 202-206 concurrently with network entity 112A and may transition from the unclaimed state to the dummyclaim state at or near the same time. Referring to block 208, based on the ring network 120 having more than one claiming management entity 110, the first network entity 112A isolates itself from a portion of the ring network 120.

In some examples, the first network entity 112A does this by sending its data packets with a dummy flag set and/or with an identifier of a claiming management entity that does not exist. This may cause claimed network entities 112 to reject packets from the first network entity 112A. To further separate the ring network 120, the first network entity 112A in the dummyclaim state rejects data packets received over the ring network 120 from any network entity 112 that is in a claimed state and rejects data packets received over the ring network 120 from any network entity 112 that is in a dummyclaim state. By rejecting these packets, the first network entity 112A stops the flow of data through the ring and effectively separates the ring network 120 into a set of independent linear networks. In contrast, the first network entity 112A may accept and process data packets received from unclaimed network entities 112.

In this way, the first network entity 112A may prevent conflicts caused by having more than one claiming management entity 110 on the same ring network 120 such as loops in the customer network 128 due to multiple active uplinks. It also segregates the data between the claiming management entities 110 so that network entities 112 belonging to one claiming management entity 110 do not process data belonging to another claiming management entity 110. This degree of enclosure 104 independence and data security may be used to support multiple independent tenants each with their own management entity 110 in a single computing system 102.

In some examples, the first network entity 112A treats data packets differently based on the enclosure 104 of the sender. In some such examples, in the dummyclaim state, the first network entity 112A rejects data packets received over the ring network 120 from claimed or dummyclaim network entities 112 in other enclosures 104. However, in the dummyclaim state, the first network entity 112A may accept and process data packets received over the ring network 120 from a network entity 112 in the same enclosure 104 regardless of state. This allows the portion of the ring network 120 that couples network entities 112 in the same enclosure to be used to synchronize the network entities 112 for redundancy and failover.

Figure 5:
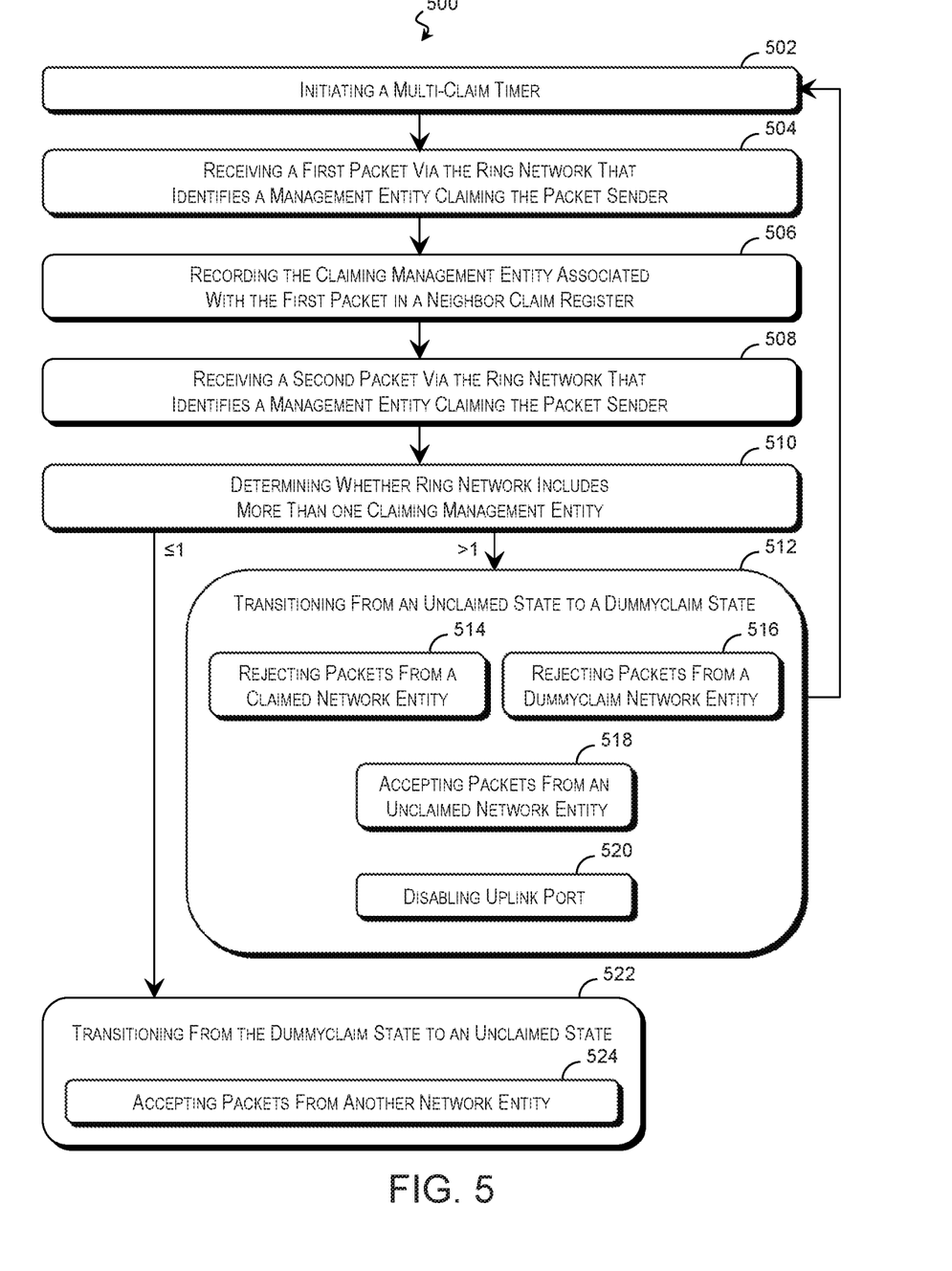
FIG. 5 is a flow diagram of a method of ring network protection according to some examples of the present disclosure.

Further examples of ring protection in a multiple-master environment are described with reference to FIGS. 5-9. FIG. 5 is a flow diagram of a method 500 of ring network protection according to some examples of the present disclosure. The description of method 500 is non-limiting, and steps may be added to and omitted from the method 500 without departing from the disclosure. Furthermore, unless noted otherwise, processes of the method 500 may be performed in any order including being performed concurrently by one or more entities. FIGS. 6-9 are block diagrams of a computing system 102 at various points in time in the method 500 according to some examples of the present disclosure. In many aspects, the computing system 102 may be substantially similar to the computing system 102 of FIG. 1 and/or computing system 102 of FIGS. 3 and 4. For example, the computing system 102 includes enclosures 104, management entities 110, network entities 112, network switches 114 with uplinks 126 to a customer network 128, and a ring network 120, each substantially as described above.

Figure 6:
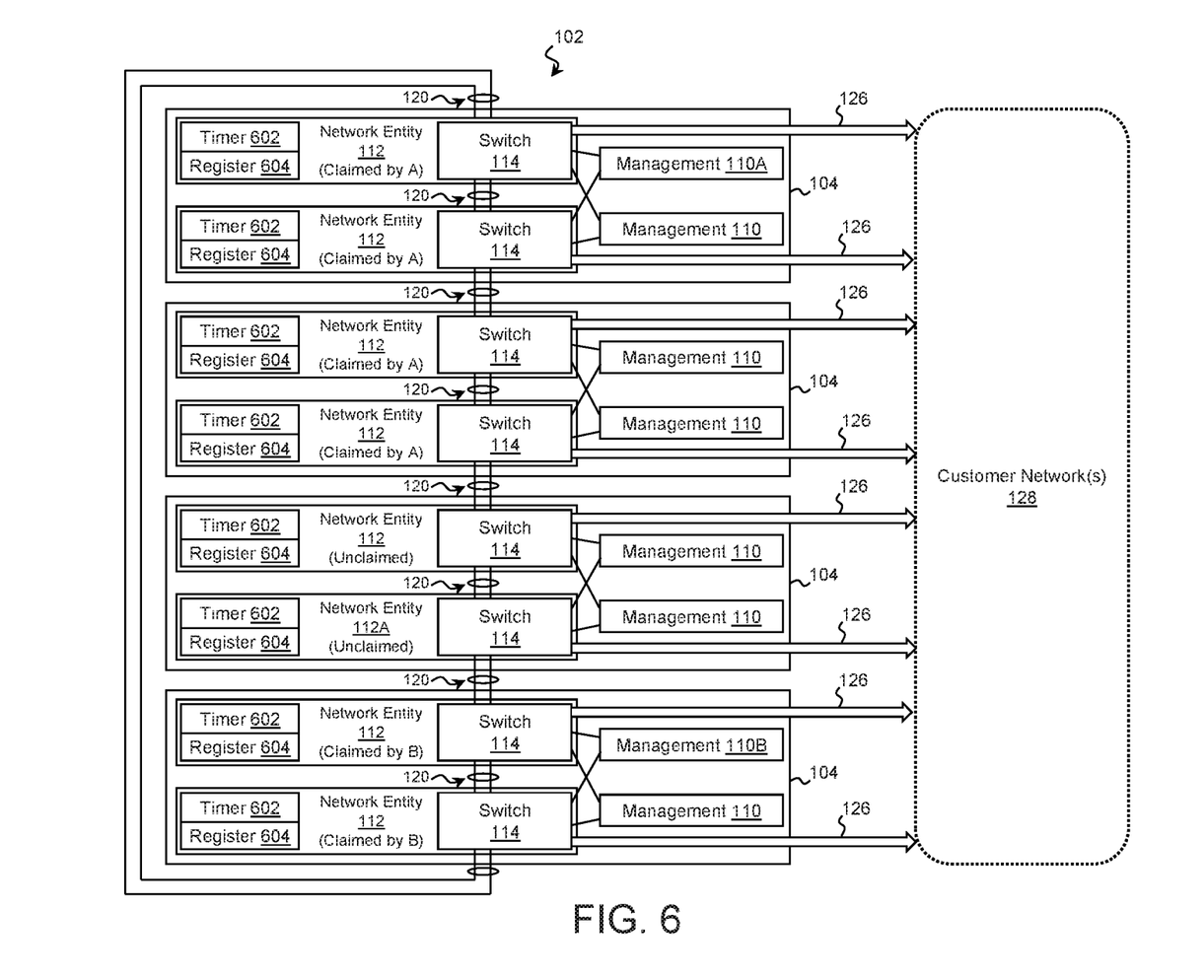
FIGS. 6-9 are block diagrams of a computing system at various points in time in the method of ring network protection according to some examples of the present disclosure.
Figure 7:
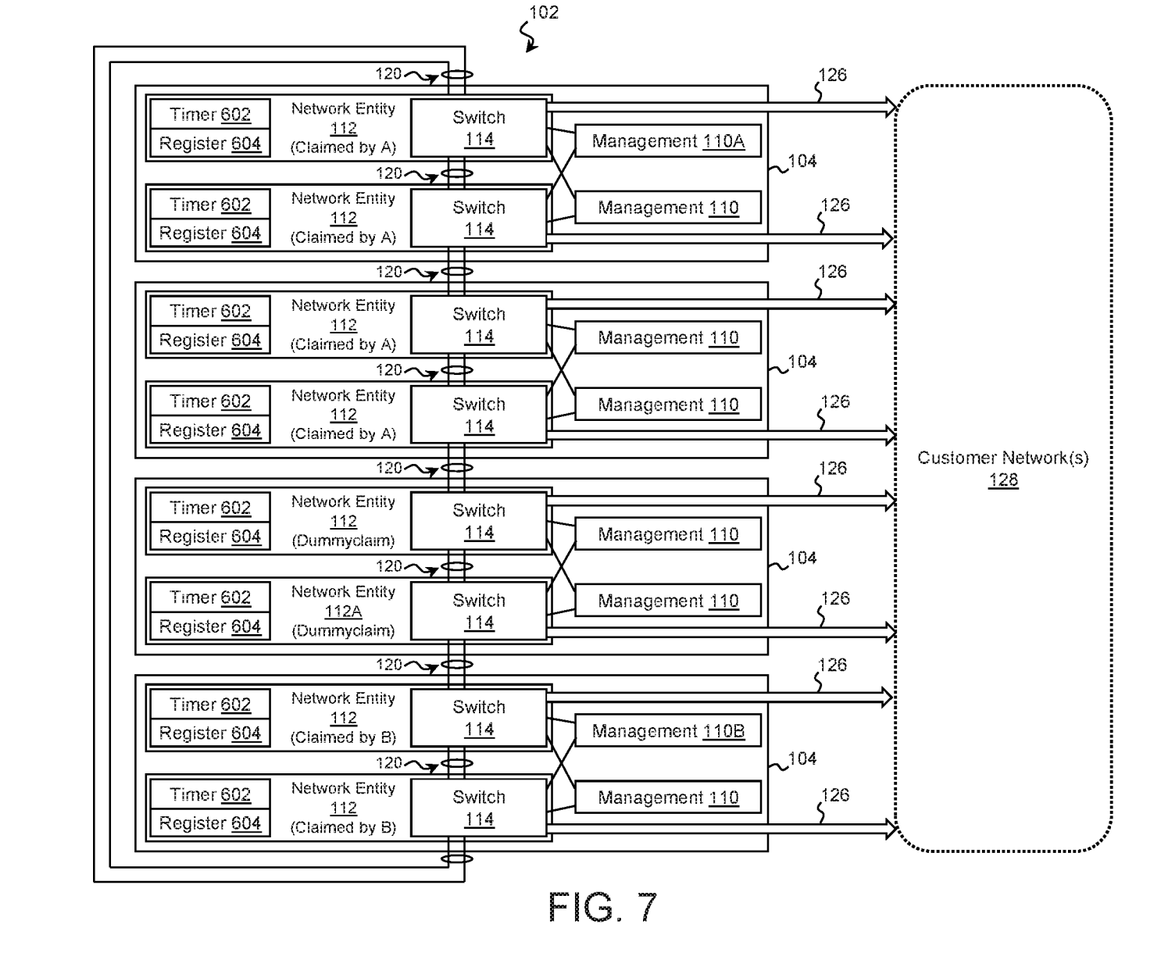

Referring first to block 502 of FIG. 5 and to FIG. 6, a first network entity 112A initiates a multi-claim timer 602. The multi-claim timer 602 measures an interval of time and may be used to determine whether a ring network 120 includes more than one claiming management entity 110. When the unclaimed first network entity 112A receives packets with different claiming management entities 110 during an interval measured by the timer 602, it may transition to a dummyclaim state and take remedial actions as described in blocks 512-520. When the first network entity 112A does not receive packets with different claiming management entities 110 during an interval, it may transition back to the unclaimed state as described in blocks 522-524.

Referring to block 504 of FIG. 5 and to FIG. 6, the first network entity 112A receives a first packet via the ring network 120. This may be performed substantially as described in block 202 of FIG. 2, and the first packet may be a network management packet, a data packet, or other suitable packet. The first packet may identify whether the sending network entity 112 is in a claimed or unclaimed state, and if the sender is in a claimed state, the first packet may identify the management entity 110 that has claimed the sender. Referring to block 506 of FIG. 5, the first network entity 112A records the claiming management entity 110 identified in the first packet in a neighbor claim register 604, a non-volatile or volatile storage medium for storing an identifier of a neighbor's claiming management entity 110.

Referring to block 508, the first network entity 112A receives a second packet via the ring network 120. This may be performed substantially as described in block 202 of FIG. 2 and/or block 502 of FIG. 5, and the second packet may be a network management packet, a data packet, or other suitable packet. The second packet may identify a management entity 110 that has claimed the sender. Referring to block 510 of FIG. 5, if the second packet identifies a claiming management entity 110 that is different from the management entity 110 recorded in the neighbor claim register 604, and the first and second packets are received within the same interval of time measured by the multi-claim timer 602, the first network entity 112A determines that the ring network 120 has more than one claiming management entity 110. As a result, the first network entity 112A transitions from an unclaimed state to a dummyclaim state as shown in block 512 and FIG. 7. The first network entity 112A may represent that it is the dummyclaim state by setting a dummy flag in its data packets and/or including an identifier of a claiming management entity that does not exist in the packets. Other network entities 112 in the same enclosure 104 may be performing the processes of blocks 502-512 concurrently with network entity 112A and may transition from the unclaimed state to the dummyclaim state at or near the same time.

Referring to block 514 of FIG. 5, in the dummyclaim state, the first network entity 112A may reject data packets received via the ring network 120 from a claimed network entity 112. Referring to block 516, in the dummyclaim state, the first network entity 112A may reject data packets received via the ring network 120 from a network entity 112 that is in the dummyclaim state. In some examples, the first network entity 112 rejects data packets received via the ring network 120 from a dummyclaim network entity 112 in a different enclosure 104, while accepting and processing packets received via the ring network 120 from a network entity 112 in the same enclosure 104 regardless of state. Referring to block 518, in the dummyclaim state, the first network entity 112A may accept data packets received via the ring network 120 from any network entity 112 that is in the unclaimed state. Referring to block 520, in the dummyclaim state, the first network entity 112A may disable an uplink 126 of the first network entity 112A that is communicatively coupled to a customer network 128.

Figure 8:
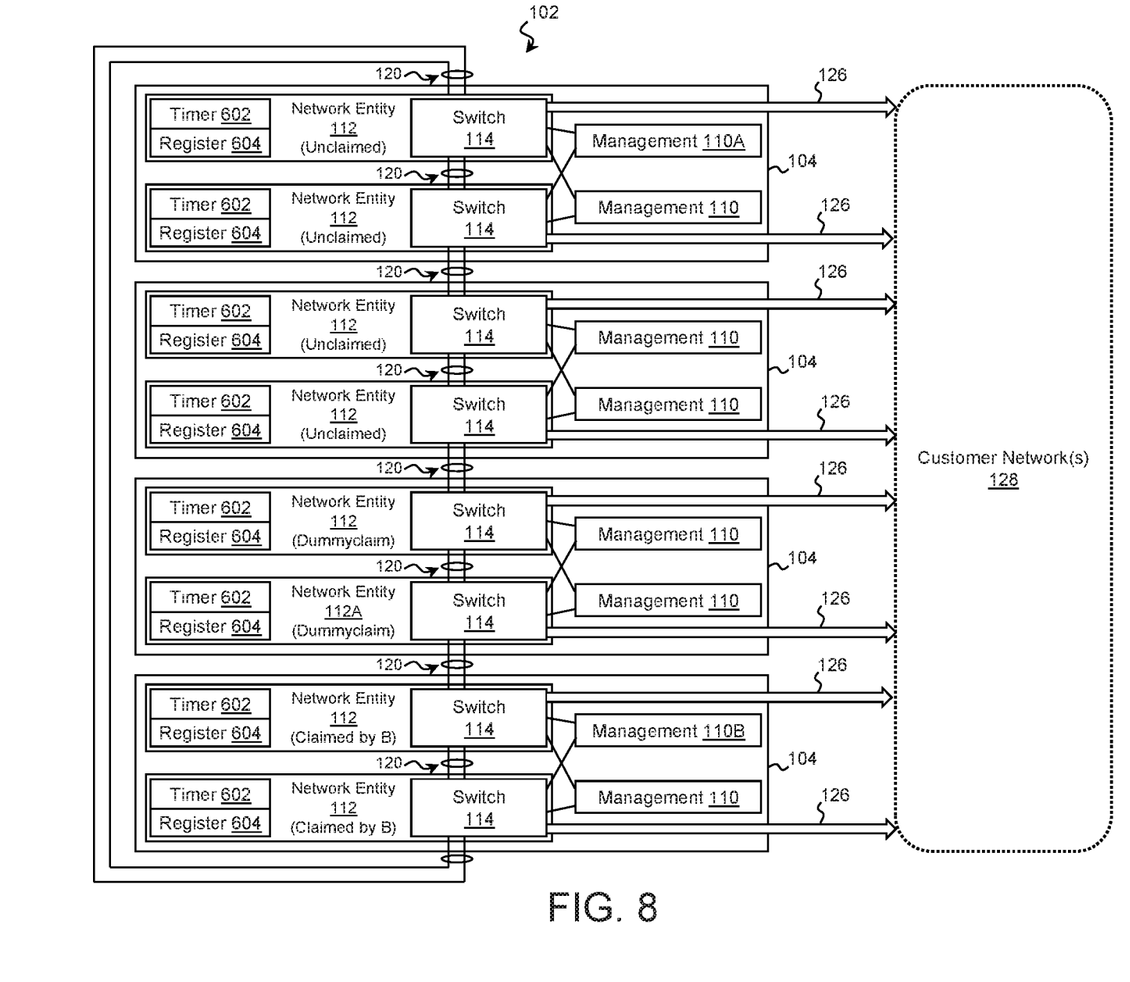
Figure 9:
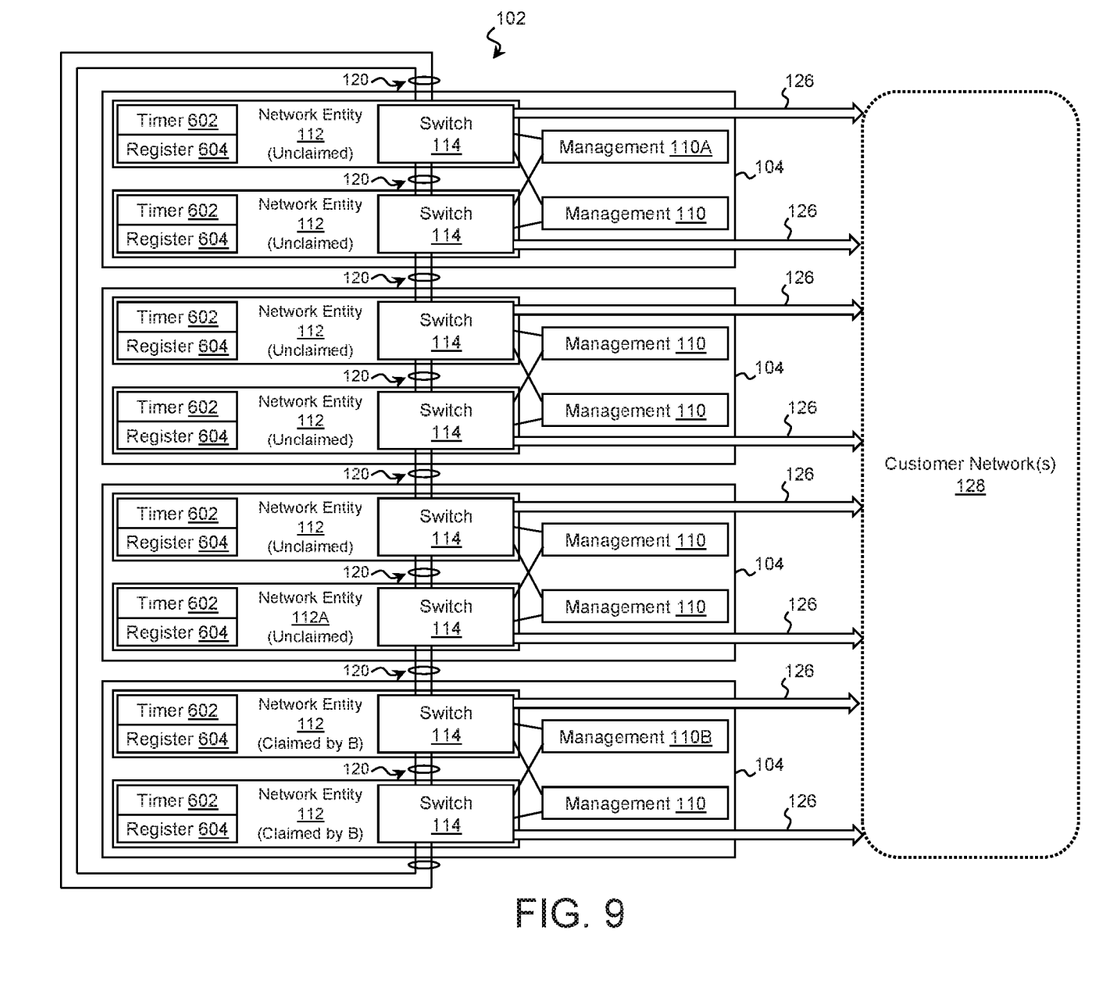

The first network entity 112A may remain in the dummyclaim state until the multi-claim timer 602 records an interval during which the ring network 120 no longer has more than one claiming management entity 110. This may be achieved by resetting, rebooting, reconfiguring, and/or replacing portions of the computing system or by any other suitable mechanism. In the example of FIG. 8, a portion of the computing system 102 is reset (e.g., a factory reset), causing the associated network entities 112 previously claimed by management entity 110A to restart in an unclaimed state.

Accordingly, when the method 500 determines that the ring network includes at most one claiming management entity 110 in block 510, the method may proceed to block 522. In some such examples, in block 510, the first network entity 112A detects that an interval measured by the multi-claim timer 602 has elapsed without receiving a packet with a claiming management entity 110 different from that stored in the neighbor claim register 604. From this, the first network entity 112A determines that the ring network 120 has, at most, one claiming management entity 110. As a result, the first network entity 112A transitions from the dummyclaim state to the unclaimed state as shown in block 522 and FIG. 9. Referring to block 524, in the unclaimed state, the first network entity 112A may accept data packets received via the ring network 120 from any network entity 112 that is in a claimed state or the unclaimed state.

Figure 10:
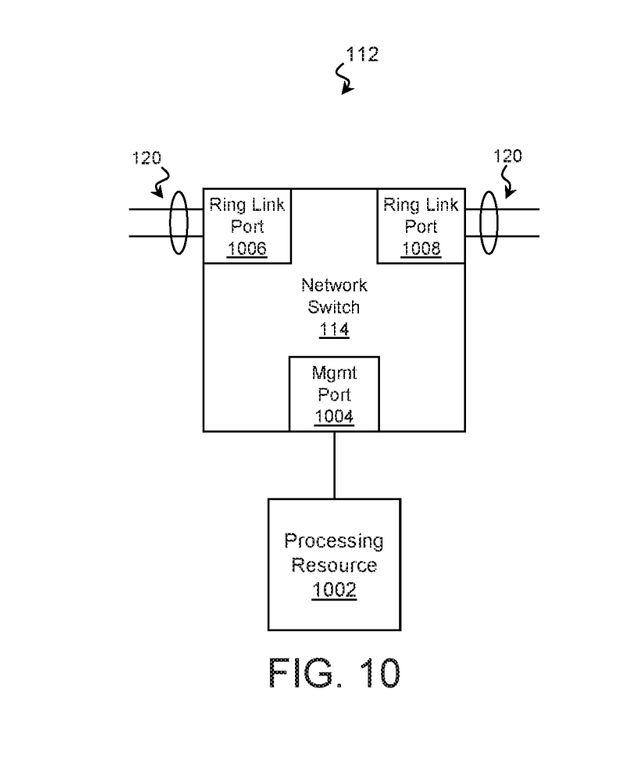
FIG. 10 is a block diagram of a network entity according to some examples of the present disclosure.

FIG. 10 is a block diagram of a network entity 112 according to some examples of the present disclosure. The network entity 112 is suitable for use as the network entity 112 in the examples of FIGS. 1, 3, 4, and 6-9 and may perform any of the processes of FIGS. 2 and 5.

The network entity 112 includes a processing resource 1002 that, in turn, includes any number and combination of CPUs, GPUs, microcontrollers, ASICs, FPGAs, and/or other processing resources. The processing resource 1002 may be coupled to a management port 1004 of a network switch 114. The processing resource 1002 may use the management port 1004 to configure the network switch 114, to analyze packets received by the network switch 114, and/or to perform other management operations.

With respect to the network switch 114, in addition to the management port 1004, the switch 114 may include a first ring link port 1006 to be communicatively coupled to a ring network 120 in a first direction, a second ring link port 1008 to be communicatively coupled to a ring network 120 in a second direction.

The network entity 112 may perform any of the processes of method 200 and/or method 500. For example, the processing resource 1002 may determine from a first packet received via the first ring link port 1006 that the ring network 120 has a plurality of claiming management entities 110 substantially as described in blocks 202-204 of FIG. 2 and/or blocks 502-510 of FIG. 5. Based on the plurality of claiming management entities, the processing resource 1002 may cause the network entity 112 to send outbound packets with an identifier of a dummy claiming management entity 110 to which the network entity 112 is not communicatively coupled and which may not be present at all. Additionally or in the alternative, the processing resource 1002 may cause the network entity 112 to send outbound packets with a dummyclaim flag set. This may be performed substantially as described in block 208 of FIG. 2 and/or block 512 of FIG. 5.

Based on the plurality of claiming management entities, the processing resource 1002 may cause the network entity 112 to reject a packet from a claimed sender substantially as described in block 208 of FIG. 2 and/or blocks 512-514 of FIG. 5. Based on the plurality of claiming management entities, the processing resource 1002 may cause the network entity 112 to reject a packet from a claimed sender substantially as described in block 208 of FIG. 2 and/or blocks 512-514 of FIG. 5. Additionally or in the alternative, based on the plurality of claiming management entities, the processing resource 1002 may cause the network entity 112 to reject a packet from a dummyclaim state sender that, like the network entity 112, has determined that the ring network 120 has a plurality of claiming management entities substantially as described in block 208 of FIG. 2 and/or block 516 of FIG. 5.

The processes of methods 200 and/or 500 may be performed by any combination of hard-coded and programmable logic in the network entity 112. In some examples, the processing resource 1002 utilizes instructions stored on a non-transitory computer-readable memory resource to perform at least some of these processes. Accordingly, examples of the present disclosure may take the form of a non-transitory computer-readable memory resource storing instructions that perform at least part of methods 200 and/or 500.

Figure 11:
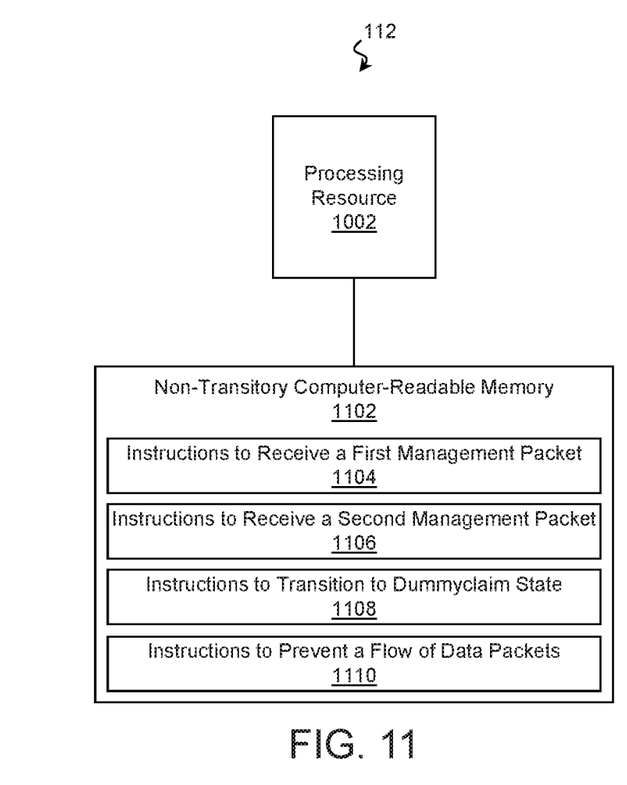
FIG. 11 is a block diagram of a network entity including a non-transitory computer-readable memory resource according to some examples of the present disclosure.

FIG. 11 is a block diagram of a network entity 112 including a non-transitory computer-readable memory resource according to some examples of the present disclosure. The network entity 112 is suitable for use as the network entity 112 in the examples of FIGS. 1, 3, 4, and 6-10 and may perform any of the processes of FIGS. 2 and 5.

The network entity 112 may include a processing resource 1002 substantially as described above and operable to perform any combination of the functions described above. To control the processing resource 1002, the network entity 112 may include a non-transitory computer-readable memory resource 1102 that is operable to store instructions for execution by the processing resource 1002. The non-transitory computer-readable memory resource 1102 may include any number of non-transitory memory devices including battery-backed RAM, SSDs, HDDs, optical media, and/or other memory devices suitable for storing instructions. The non-transitory computer-readable memory resource 1102 may store instructions that cause the processing resource 1002 to perform any process of any block of methods 200 and/or 500, examples of which follow.

Referring to block 1104, the non-transitory computer-readable memory resource 1102 may store instructions that cause the processing resource 1002 to receive a first network management packet via a ring network. This may be performed substantially as described in block 202 of FIG. 2 and/or block 504 of FIG. 5, and the first network management packet may have a first claiming device associated with it indicating that the first claiming device has claimed the sender.

Referring to block 1106, the non-transitory computer-readable memory resource 1102 may store instructions that cause the processing resource 1002 to receive a second network management packet via the ring network. This may be performed substantially as described in block 202 of FIG. 2 and/or block 508 of FIG. 5, and the second network management packet may have a second claiming device associated with it indicating that the second claiming device has claimed the sender.

Referring to block 1108, the non-transitory computer-readable memory resource 1102 may store instructions that cause the processing resource 1002 to transition the network entity 112 from an unclaimed state to a dummyclaim state based on the first claiming device being different from the second claiming device. This may be performed substantially as described in block 206 of FIG. 2 and/or block 512 of FIG. 5.

Referring to block 1110, the non-transitory computer-readable memory resource 1102 may store instructions that cause the processing resource 1002 to prevent a flow of data packets through the ring network. This may be performed substantially as described in block 208 of FIG. 2 and/or blocks 514-520 of FIG. 5. In various examples, the network entity 112 prevents the flow of data packets by rejecting data packets received via the ring network 120 from any network entity 112 in a claimed and/or dummy claim state.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
   receiving, by a first network entity via a ring network which comprises a plurality of network entities, a first packet identifying a first management entity which claims a first sender of the first packet; and
   in response to receiving, by the first network entity via the ring network, a second packet which identifies a second management entity, wherein the second management entity claims a second sender of the second packet and is different from the first management entity;
   starting a timer for an interval of time;
   determining that the ring network has a plurality of management entities each claiming a respective network entity; and
   based on the ring network having the plurality of management entities each claiming the respective network entity:
      transitioning the first network entity from an unclaimed state to a dummyclaim state; and
      isolating the first network entity from a remainder of the ring network.

2. The method of claim 1, wherein isolating the first network entity comprises:
the first network entity rejecting a third packet received via the ring network from a second network entity based on the second network entity being in a claimed state or in a dummyclaim state.

3. The method of claim 1, wherein the first network entity is associated with a first enclosure, and wherein isolating the first network entity comprises:
the first network entity rejecting a third packet received via the ring network from a second network entity based on the second network entity being associated with a second enclosure which is different from the first enclosure and further based on the second network entity being in a claimed state or in a dummyclaim state; and
the first network entity accepting a fourth packet received via the ring network from a third network entity based on the third network entity being associated with a third enclosure which is the same as the first enclosure.

4. The method of claim 1, wherein isolating the first network entity comprises the first network entity accepting a third packet received via the ring network from a second network entity based on the second network entity being in an unclaimed state.

5. The method of claim 1, further comprising:
rejecting a third packet from the first network entity by a second network entity based on the first network entity being in the dummyclaim state and based on the second network entity being in a state from a group consisting of:
the dummyclaim state and a claimed state.

6. The method of claim 1, wherein determining that the ring network has the plurality of management entities comprises comparing a first claiming entity associated with the first packet with a second claiming entity associated with a third packet received by the first network entity via the ring network.

7. The method of claim 1, wherein subsequent to transitioning the first network entity from the unclaimed state to the dummyclaim state, the method further comprises:
determining, by the first network entity, from a third packet and one of the second packet and a fourth packet, that the ring network no longer includes the plurality of management entities each claiming the respective network entity; and
in response to the determining the ring network no longer includes the plurality of management entities each claiming the respective network entity, transitioning the first network entity from the dummyclaim state to the unclaimed state.

8. The method of claim 1, wherein the first packet is from a group consisting of:
a continuity check protocol packet and an owner selection protocol packet.

9. The method of claim 1, wherein the first network entity includes an uplink to a customer network, and wherein the method further comprises:
based on the ring network having the plurality of management entities each claiming the respective network entity, disabling the uplink of the first network entity.

10. A network entity comprising:
a network switch including:
a first ring link port coupled to a ring network; and
a second ring link port coupled to the ring network; and a processing resource coupled to a management port of the network switch, wherein the processing resource is to:
receive, via the first ring link port, a first packet identifying a first claiming management entity which claims a first sender of the first packet; and
in response to receiving, via the first ring link port, a second packet which identifies a second claiming management entity, wherein the second management entity claims a second sender of the second packet and is different from the first claiming management entity:
start a timer for an interval of time; and
determine that the ring network has a plurality of claiming management entities; and
based on the plurality of claiming management entities:
send a third packet with an identifier of a claiming management entity to which the network entity is not communicatively coupled; and
reject a fourth packet based on a sender of the third packet being claimed by a management entity of the plurality of claiming management entities.

11. The network entity of claim 10, wherein the processing resource is to, based on the plurality of claiming management entities, reject a fifth packet based on a sender of the fifth packet having determined that the ring network has a plurality of claiming management entities.

12. The network entity of claim 10, wherein the processing resource is to, based on the plurality of claiming management entities, accept a fifth packet based on a sender of the fifth packet being unclaimed.

13. The network entity of claim 10, wherein the processing resource is to, based on the plurality of claiming management entities:
determine from a fifth packet that the ring network no longer includes the plurality of claiming management entities; and
in response to the ring network no longer including the plurality of claiming management entities, accept a sixth packet based on a sender of the sixth packet being claimed.

14. The network entity of claim 10, wherein the processing resource is to determine that that the ring network has the plurality of claiming management entities based on a claiming device identifier of the first packet being different from a claiming device identifier of a fifth packet received via the ring network.

15. A non-transitory computer-readable memory resource storing instructions that, when executed, cause a processing resource to:
receive a first data packet via a ring network which comprises a plurality of network entities, wherein the first data packet has a first claiming management entity associated therewith; and
in response to receiving a second data packet via the ring network, wherein the second data packet has a second claiming management entity associated therewith, wherein the second claiming management entity is different from the first claiming management entity:
start a timer for an interval of time; and
based on the first claiming management entity being different from the second claiming management entity:
transition a network entity from an unclaimed state to a dummyclaim state; and
prevent a flow of data packets through the ring network.

16. The non-transitory computer-readable memory resource of claim 15 storing instructions that cause the processing resource to:
   in the dummyclaim state, reject a first data packet received via the ring network based on a sender of the first data packet being in a claimed state.

17. The non-transitory computer-readable memory resource of claim 16 storing instructions that cause the processing resource to:
   in the dummyclaim state, reject a second data packet received via the ring network based on a sender of the second data packet being in the dummyclaim state.

18. The non-transitory computer-readable memory resource of claim 15 storing instructions that cause the processing resource to:
   in the dummyclaim state, accept a data packet received via the ring network based on a sender of the data packet being in the unclaimed state.

19. The non-transitory computer-readable memory resource of claim 15 storing instructions that cause the processing resource to:
   determine that the ring network has a single claiming entity; and
   in response to the single claiming entity, transition the network entity from the dummyclaim state to the unclaimed state.

20. The non-transitory computer-readable memory resource of claim 15, wherein the first network management packet and the second network management packet are each from a group consisting of:
   a continuity check protocol packet, and an owner selection protocol packet.

* * * * *